July 28, 1959 R. B. ATKINSON ET AL 2,897,286

VARIABLE AREA MAGNETIC RECORDING APPARATUS

Original Filed Dec. 15, 1951 2 Sheets-Sheet 1

INVENTORS
RALPH B. ATKINSON
STEVEN G. ELLIS
BY Zalwider Mattingly & Huntley
Attorneys

VARIABLE AREA MAGNETIC RECORDING APPARATUS

Original Filed Dec. 15, 1951 2 Sheets-Sheet 2

INVENTOR.
RALPH B. ATKINSON
STEVEN G. ELLIS
BY Lulwider Mattingly & Huntley
Attorneys 2,897,286

VARIABLE AREA MAGNETIC RECORDING APPARATUS

Ralph B. Atkinson, Los Angeles, and Steven G. Ellis, Van Nuys, Calif.; said Ellis assignor to said Atkinson Original application December 15, 1951, Serial No. 261,892. Divided and this application June 29, 1954, Serial No. 440,094

12 Claims. (Cl. 179—100.2)

This invention relates generally to the magnetic recording of intelligence, and has particular reference to a magnetic recording apparatus for producing a variable area magnetic recording of signals corresponding to such intelligence.

This application is a division of our copending application Serial No. 261,892, filed December 15, 1951, for Variable Area Magnetic Recording Apparatus.

Magnetic recording on a specially designed magnetic tape or wire has long been known and used, and the many advantages of such recording have widened the field of use considerably. More recently, the utility of the magnetic recording processes has been greatly increased by the development of certain methods for making visible magnetic recordings as distinguished from the earlier types of recordings wherein the recorded material was completely invisible.

It is possible to render the magnetic recording visible by flowing finely divided magnetic particles over the magnetic recording so that the particles are held to the record material in varying amounts depending upon the intensity of magnetization of the particular area of the material. A method and apparatus for magnetic reproduction of pictures using this general method of flowing magnetic particles over a magnetized record is the subject of a copending application Serial No. 221,044 filed April 14, 1951, by Ralph B. Atkinson and Steven G. Ellis. As is disclosed in that application, the visible record formed upon the magnetized record material may be transferred to another support to produce a permanent print or copy of the magnetic record. The process of making visible records from magnetic records has been termed "ferrography," and the process has come to be known as the ferrographic process as distinguished from the photographic process wherein light-sensitive materials are employed.

In a copending application Serial No. 250,364, filed October 8, 1951, by Ralph B. Atkinson and Steven G. Ellis, it is pointed out that prior to the invention therein disclosed of an apparatus for making a variable area magnetic recording, ferrography had seldom been used in the recording of technical data because the resulting visible record revealed only areas of different densities, because prior thereto the magnetic recording apparatus in use was capable only of producing a variable density record. Since it is difficult to evaluate the differences in intensity, either by observation or physical measurement, the use of the ferrographic process for the recording of technical data was limited almost entirely to those applications where it was desired only to obtain qualitative results.

The aforementioned copending application Serial No. 250,364 discloses an apparatus for producing a variable area recording wherein the height of the record at any given point corresponds to the intensity of the recorded signal. By making such a record visible by the ferrographic process, it is possible to obtain a record comprising an oscillogram of the applied signal. Such a record combines the advantages of a record made by a directreading, pen-type oscillograph with the speed of response corresponding to that of the cathode ray oscilloscope. In addition, the disadvantages of the photographic method of recording encountered in both the mirror-type oscillograph and cathode ray oscilloscope are avoided.

In the apparatus disclosed in the aforementioned copending application Serial No. 250,364 a variable area recording is obtained by passing the recording medium beneath a recording head which provides a recording gap of substantial length extending transversely of the direction of travel of the recording medium. In one form disclosed in that application, the recording gap is made V-shaped—that is, wider at one end than at the other, thus causing a concentration of the flux at the narrow end of the gap. Thus, at low signal intensities a permanently magnetized record is produced only in that portion of the recording medium passing the narrow end of the gap, whereas at higher signal levels, the flux density is increased across the wider portions of the gap so as to record a correspondingly wider line on the moving recording medium.

While the apparatus disclosed in said aforementioned copending application Serial No. 250,364 is entirely practical, the apparatus nevertheless embodies certain disadvantages residing principally in the difficulty of forming a V-shaped gap of the required accuracy. It will be appreciated that the air gaps used in magnetic recording are extremely small, and a V-shaped gap for producing a variable area magnetic recording may have a minimum width of one-half mil (the term "mil" being used to represent a distance of one one-thousandth of an inch), and a maximum width of perhaps one and one-half mils. Furthermore, in order to achieve a desired recording characteristic, it may be necessary to make the sides of the gap curved as distinguished from the straight sides of a truly V-shaped gap. The use of a curved support for a variable clearance between the recording head and the recording medium disclosed as alternative modifications in said copending application Serial No. 250,364 does not completely obviate the disadvantages and difficulties of construction of the V-shaped gap because they introduce the difficulty of feeding the recording medium over a curved support and also tend to produce loss of definition due to fringing resulting from the spacing of the recording head from the recording medium.

To overcome the above-mentioned disadvantages, this invention provides a variable area recording apparatus which eliminates the need for any curved supports for the recording medium or the necessity of spacing the recording head from the record material. Instead, the present invention provides a recording apparatus which is maintained in constant contact with the recording medium throughout the entire length of the elongated recording element, and provides also for the selection of substantially any desired relationship between the location along the length of the element and the recording magnetomotive force at that location.

It is therefore an object of this invention to provide a magnetic recording apparatus for producing variable area recordings which utilizes a recording element of substantial length and uniform width which is maintained in contact with the recording medium throughout the length of the recording element.

It is also an object of this invention to provide an apparatus of the character set forth in the preceding paragraph which includes an electromagnet for producing an integrated magnetomotive force along the recording element as a whole, corresponding to a signal to be recorded, together with means for producing a concentration of magnetic flux at one end thereof.

It is an additional object of this invention to provide an apparatus of the character set forth hereinbefore in which means is provided for producing along the recording element magnetomotive forces bearing a ratio to the integrated magnetomotive force which is a function of the location along the length of the element.

It is also an object of this invention to provide an apparatus of the character set forth hereinbefore which includes a single pole structure of substantial length having its ends connected magnetically to opposite poles of the electromagnet, said pole structure having a substantial reluctance producing on the surface of said structure magnetic pole strengths which vary along the length of said structure.

It is a further object of this invention to provide an apparatus of the character set forth in the preceding paragraph in which said pole structure has a cross section including a V-shaped portion to define at the apex of said V-shape a narrow edge for engaging the recording medium.

Other objects and advantages of this invention will be apparent from a consideration of the following specification, read in connection with the accompanying drawings, wherein.

Figure 1:
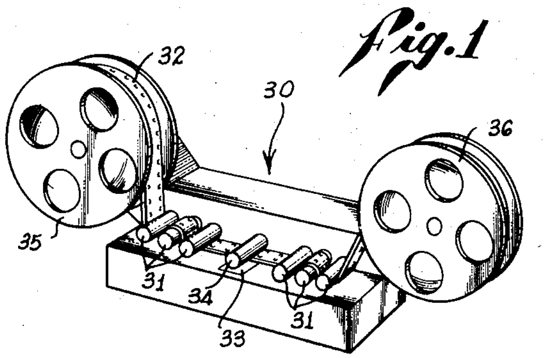
Figure 1 is a perspective view illustrating one form of a variable area recording apparatus constructed in accordance with this invention may take.

Essentially, this invention contemplates the use of a magnetic tape transport means, a magnetic recording head of special construction against which the tape bears and across which it passes while being transported, together with associated electrical apparatus for supplying an appropriate signal to the recording head. Such an apparatus is illustrated in Figure 1 as comprising a cabinet or housing 30 which encloses a suitable electric motor (not shown) or other source of motive power for driving film sprockets or rollers 31 for moving a transportable magnetic tape 32 past a recording head 33. As the tape 32 is moved past the recording head 33, it is maintained in constant and intimate contact therewith by a roller 34 or pressure pad of usual and conventional construction.

To facilitate transporting the tape 32 in the manner described, the same is preferably perforated in the general manner of motion picture films. While unperforated tape may be used, and while the tape 32 may be of substantially any desired width, a preference is expressed for a tape having the width and sprocket hole arrangement of conventonal 35 mm. film because of the ready availability of suitable sprockets, reels, and the like.

The drive means for rotating the sprockets 31 is arranged preferably to transport the tape at a constant linear speed past the recording head 33 so as to permit ready and accurate measurements with respect to time. When so transported, the tape 32 is fed from a suitably supported supply reel 35, and after recording is wound upon a suitable take-up reel 36.

Figures 2, 4:
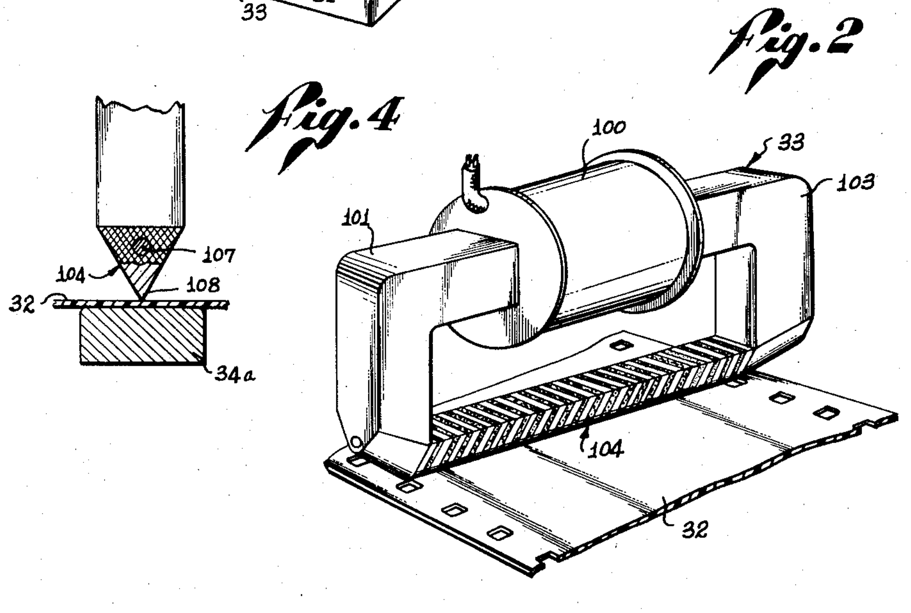
Figure 2 is a perspective view illustrating the construction of a variable area recording head embodying the principles of this invention.
Figure 4 is a fragmentary cross-sectional view taken substantially along the line 4—4 of Figure 3.

The recording head 33, which is of special construction, may be constructed in accordance with the principles illustrated in Figure 2 to include a coil 100 surrounding a suitable magnetic core 101 which is connected by means of magnetic circuit members 102 and 103 to opposite ends of a single pole structure represented generally by the reference character 104.

At the outset, it should be recognized that the drawings accompanying this application are largely diagrammatic, the arrangement of parts and details of construction shown having been selected with a view to best illustrating the principles of the invention. Different arrangements and details of construction which will be obvious to those skilled in the art may be employed to embody the principles of this invention in more compact structures designed also to facilitate the manufacture thereof. Furthermore, it should be recognized that the drawings are not to scale, and are mal-proportioned for the purpose of clearly illustrating the essential features of construction, certain structural parts having widths and thicknesses of the order of magnitude of one mil being represented in the drawings as being of substantial width and thickness for the purpose of clearly illustrating the construction.

The coil 100 may be of substantially conventional construction, wound to provide a number of turns sufficient to produce a substantial magnetomotive force and to provide an impedance appropriate to the source of signal to be recorded. The magnet circuit members 102 and 103 may also be constructed along conventional lines, preferably being laminated to minimize hysteresis and eddy current losses, and are preferably made of a high-permeability, low-loss material. The members 102 and 103 are proportioned to provide a reluctance which is low compared to the reluctance of the pole structures 104.

Figure 3:
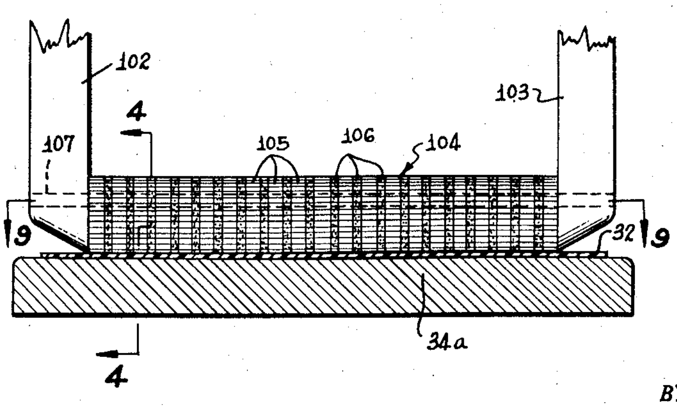
Figure 3 is a side elevational view of the pole structure utilized in the apparatus shown in Figure 2.

As may be seen from Figures 2 and 3, the pole member 104 comprises a plurality of thin magnetic members 105 separated from each other by non-magnetic spacer members 106 formed of brass, beryllium copper, or other suitable material. The entire assembly of magnetic members 105 and spacer members 106 may be threaded onto a pin 107 suitably secured in appropriate apertures provided at the lower ends of the magnetic circuit members 102 and 103.

The pole member 104 is preferably given a triangular cross section as may be seen in Figure 4 so as to define a relatively sharp downwardly directed edge 108 which is caused to bear against the upper surface of the recording medium 32. The edge 108 is, of course, positioned directly above the pressure pad 34.

Ths operation of the recording head 33 may perhaps best be understood by assuming that a direct current is passed through the coil 100 so as to provide a north magnetic pole at the end of the structure adjacent the magnetic member 102, and a corresponding south magnetic pole at the end adjacent the member 103. The pole structure 104 has a substantial reluctance due to the accumulated air gaps provided by the spacer members 106, and when so externally excited, appears to have the characteristics of a permanent bar magnet displaying a north magnetic pole at one end, and a south magnetic pole at the other. The center of the structure exhibits a pole strength of zero, and the pole strength increases from the center toward the ends, becoming stronger and stronger in north polarity as the end adjacent the member 102 is approached, and stronger and stronger in south polarity as the end adjacent the member 103 is approached.

The resulting local magnetic poles produced along the edge 108 of each of the magnetic members 105 serves to permanently magnetize the recording medium 32 in the same manner that a strongly magnetized bar magnet or like structure would magnetize the material.

Figure 5:
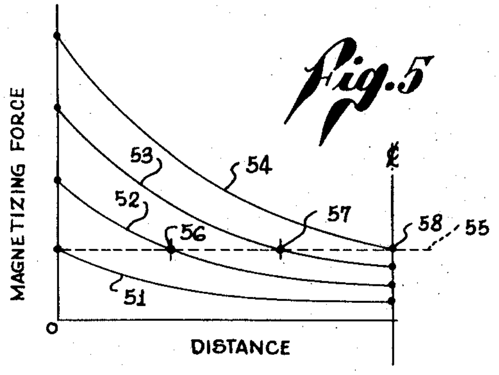
Figure 5 is a graph representing the manner in which the magnetizing force at a given location varies as a function of that location along the length of the recording element.

In Figure 5 there is plotted a family of four curves 51, 52, 53, and 54 representing the pole strength as measured at different positions along the length of the element edge 108, the origin of the curve being taken at one end of the pole member 104. The four curves 51–54 represent the pole strengths produced by four different intensities of magnetization produced by the coil 100. The horizontal dotted line 55 represents a threshold level of pole strength below which no permanent magnetization of the recording medium will be produced. Curve 51 therefore represents the minimum signal level which, when applied to the coil 100, will produce any permanent magnetic record, and by observing that the intersection of the curve 51 with the line 55 occurs at the origin, it will be seen that this represents the limiting condition producing a permanent record only at the extreme edges of the tape. Curve 52 represents a higher signal level, and it will be observed that the curve crosses the line 55 at the point marked 56. Thus in the region to the left of the point 56 the pole strength will be sufficient to produce a permanent magnetic record, whereas in the region to the right of the point 56 the magnetizing intensity will be insufficient. Thus a signal of a magnitude such as is represented by the curve 52 will cause a permanent recording to be made for distances transversely from the edges of the tape approximating one sixth the length of the edge 108.

The curves 53 and 54 respectively intersect the threshold level line 55 at the points marked 57 and 58, representing, respectively, the intensities of magnetization required to produce permanent magnetic recordings extending inwardly from the tape edges, respectively, for one-third the length of the edge 108 all the way to the center.

Figure 6:
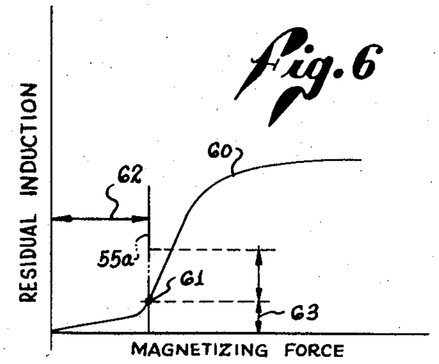
Figure 6 is a graph representing the magnetic characteristics of typical magnetic recording media.

Whether or not a given magnetizing force will produce a permanent magnetic record and the intensity of magnetization of that record depends, of course, upon the magnetic characteristics of the recording medium. There is illustrated in Figure 6 a characteristic curve which is representative of the magnetic characteristics of magnetic recording media generally. In Figure 6 there is shown a curve 60 which represents the relation between the magnetizing force applied to a magnetic recording medium and the resulting residual induction or permanent magnetization after the magnetizing force is removed. Assuming a neutral recording medium, the curve starts at the origin representing zero residual induction when no magnetizing force is applied. The curve rises slowly to a point marked 61, the abscissa of which is represented by the dimension line bearing the reference character 62, and the ordinate of which is represented by the dimension line bearing the reference character 63. The dimension 63 represents the threshold residual induction and constitutes that degree of permanent magnetization which will produce a definite though low intensity of permanent magnetism in the magnetic recording medium. The dimension line 62 represents the amount of magnetizing force which must be applied to produce such a threshold condition.

The curve 60 is similar to the H and D curve used to represent the properties of photographic materials, the dimension 62 corresponding to the inertia of photographic materials, and the slope of the steeply rising portion corresponding to the gamma of the photosensitive material.

Ideally, the magnetic recording medium selected for use with a variable area magnetic recording head of the type herein described has a small inertia—that is, a short dimension line 62, so that the amount of magnetizing force necessary to produce a permanent record need not be too great. The steeply sloping part of the curve 60 should have as steep a slope as possible so that once the magnetizing force exceeds the threshold value, the residual induction will rise rapidly with small increases in magnetizing force so as to produce a record which in appearance, after being coated with the visible magnetic particles, displays a clean, well-defined line of demarcation between those portions which have been permanently magnetized and those which have not.

In Figure 6 the dashed line 55*a* passing vertically through the point 61 represents the threshold value of magnetizing force which is represented in Figure 5 by the dashed line 55.

Thus it is seen from a comparison of Figures 5 and 6 that as the energy supplied to the magnetizing coil 100 is increased, no permanent magnetic record is produced until the magnetizing force reaches the mentioned threshold value for the portion of the recording edge 108 nearest the magnetic circuit members 102 and 103, such level of magnetizing force being represented by the curve 51 of Figure 5. Thereafter, as the energy supplied to the coil 100 is increased, the length of that portion of the recording edge 108 along which the magnetizing force is greater than the threshold value correspondingly increases until, at the maximum signal condition, the magnetomotive force is at all points along the length thereof higher than the threshold value.

Figure 7:
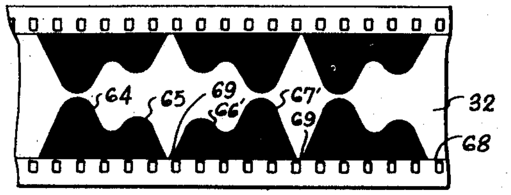
Figure 7 is a diagrammatic representation of the type of record produced by a recording head of the character illustrated in Figure 2.
Figure 8:
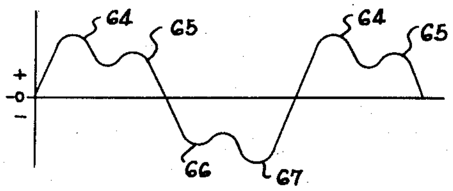
Figure 8 is a graph illustrating the wave form of the signal represented by the recording illustrated in Figure 7.

Figure 7 illustrates the type of record produced by the described operation of the magnetic recording head shown in Figure 2 when there is applied to the coil 100 thereof a signal of the character illustrated graphically in Figure 8.

The signal represented by Figure 8 constitutes an alternating electrical potential of a given fundamental frequency and carrying a substantial second harmonic component resulting in the production of two distinct positive peak signals 64 and 65 followed by two corresponding negative peak signals 66 and 67. Thereafter the cycle repeats itself at the fundamental frequency. The magnetic record which is produced is of the character illustrated in Figure 7 consisting of identical recordings extending inwardly from base lines 68 near the edges of the tape, each such recording including positive peaks 64 and 65 followed by what may be termed a rectified representation of the negative half of the cycle resulting in the peaks 66′ and 67′. The apparent polarity reversal results from the fact that the magnetic material which is flowed across the magnetized recording medium adheres equally well to both polarities of magnetization, and does not distinguish between those elemental areas having a north polarity and those having a south polarity. Once this fact is recognized, the wave form of the original signal is quite clearly seen by inspection of the record produced. The important consideration is that the length of the visible recording, measured inwardly in Figure 7 from the base lines 68 (corresponding to the ends of the recording edge 108 situated nearest the magnetic circuit members 102 and 103) corresponds to the instantaneous amplitudes of the signal applied to the electromagnet.

The record produced is represented in Figure 7 as being characterized by narrow blank spaces 69 corresponding to the points at which the signal level is below the aforementioned threshold value. This is consistent with the initial assumptions made thus far in describing the operation of the apparatus in which a neutral magnetic recording medium is assumed, and in which the signal is applied directly to the coil 100 without the use of any bias currents or modulated carrier signals. These blank spaces are readily eliminated through the application of any of a number of well-known magnetic recording techniques such as the use of a premagnetized recording medium, the use of either direct or high-frequency bias currents, or by the use of a carrier signal of high frequency upon which the signal to be recorded is applied as an amplitude modulation.

Preferably, the recording head is so constructed as to produce a linear relationship between the amplitude of the applied signal and the length of the recording edge 108 which develops a magnetizing force in excess of the threshold value. If such a linear relationship is established, then the visible record produced represents truly the wave form or amplitude variations of the applied signal.

As will be apparent to those skilled in the art, this does not necessarily require a linear relation between the magnetizing force and the distance along the edge at which that magnetizing force is measured. In fact, as may be seen from an inspection of Figure 5, the characteristic is most probably curved so as to be concave upwards, but the degree of curvature and the shape of the curve will depend upon many factors, not the least important of which is the characteristics of the recording medium used.

Figure 9:
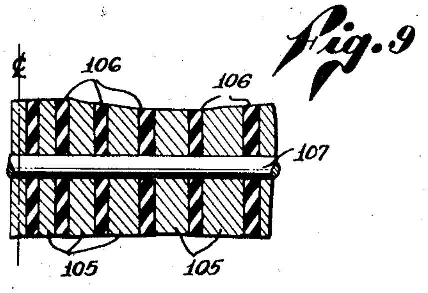
Figure 9 is an enlarged fragmentary sectional view illustrating a modification of the pole structure for producing a differently shaped recording characteristic.
Figure 10:
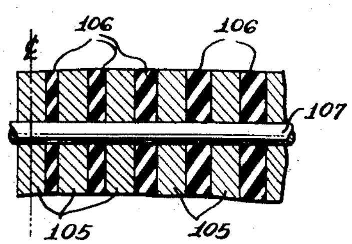
Figure 10 is a fragmentary sectional view similar to Figure 9 but illustrating a different arrangement for producing differently shaped recording characteristics.

The shape of the curve can be changed by causing the reluctance of the pole member 104 to vary along the length thereof. This may be accomplished by appropriate selection of the thickness of the magnetic members 105 and the spacing members 106. In Figure 9, for example, there is illustrated diagrammatically an arrangement utilizing spacer members 106 of like thickness to separate magnetic members 105, the thickness of which diminishes progressively as the center of the structure is approached. A different though somewhat similar arrangement is illustrated in Figure 10, wherein the magnetic members 105 are all of the same thickness, but wherein the thickness of the non-magnetic spacers 106 is caused to progressively reduce as the center of the structure is approached.

It will be observed that the magnetic circuit members 102 and 103 each operate to apply to one end of the pole structure 104 without appreciable attenuation the magnetizing force generated by the electromagnet. The pole member 104 is made with a relatively high reluctance so as to cooperate with the backing member 34 in producing between the knife edge 108 and the backing member 34 a magnetizing force which varies in magnitude along the length of the pole member 104.

In this respect it will be observed that the device operates primarily to magnetize the recording medium perpendicularly as distinguished from the lateral magnetization produced by the recording devices heretofore known.

It should be noted, also, that the laminated structure illustrated in the drawings may be replaced with a single homogeneous member of suitably high reluctance per unit length. Such a suitably high reluctance may be obtained through appropriate selection of material. Such a member may, for example, be formed of a suitable synthetic resin heavily impregnated with powdered magnetic material such as iron dust. Somewhat similar structures can be made from powdered magnetic materials which are bonded to each other by a suitable adhesive or by means of a sintering or semi-sintering process.

From the foregoing, it will be observed that this invention provides an apparatus for producing a variable area magnetic recording, and that the apparatus includes a variable area magnetic recording head characterized by the employment of a recording element of substantial length. The invention described herein avoids certain of the disadvantages inherent in the apparatus disclosed in the hereinbefore mentioned copending application, and provides a structure which is susceptible to ready and accurate manufacture. Furthermore, as will have been observed, the construction is such as to permit the shape of the recording characteristic curve to be selected substantially at will. This is accomplished by appropriately selecting the reluctances of the various parts of the magnetic circuit, and does not require any changes in the configuration or dimensions of the recording element.

While an attempt has been made herein to disclose and explain the underlying principles of the invention, no attempt has been made to give precise directions for the determination of the dimensions of the various parts of the magnetic apparatus for the reason that experience has indicated that these dimensions and characteristics are more quickly determined by trial and error than by calculation since it is not possible in calculations of this type to take into account all of the factors which determine the ultimate results. It is believed, however, that the principles of the invention have been outlined with sufficient clarity to permit one skilled in the art to make, without difficulty, a variable area magnetic recording head of the type herein described, and to permit such a head to be used for the making of variable area recordings.

Attention is directed particularly to the fact that by the use of the apparatus herein disclosed, it is possible to make visible records constituting oscillograms of the signal applied to the recording head, and that these oscillograms may be rendered immediately visible for study without the delay and difficult processing attendant upon the use of photographic recording methods.

While the various preferred embodiments of this invention have been illustrated and described herein, the invention is not to be limited to the details illustrated and described, except as defined in the appended claims.

We claim:

1. In a variable area magnetic recording head for producing on a longitudinally moving elongated magnetizable recording medium a permanent magnetic record of an electrical signal in which the height of said record transversely of said medium varies in correspondence with variations of the instantaneous amplitude of said signal, the combination of: an electromagnet for producing a magnetomotive force corresponding to said signal; magnetic conductor means of low reluctance, comprising a pair of members spaced from each other and each extending from one pole of said electromagnet; and a magnetic pole structure of a length substantially equal to the maximum width of the resulting magnetic record, having a relatively high reluctance from end to end, extending from one of said magnetic conductor means to the other and adapted to be disposed transversely across said longitudinally moving medium with one surface in contact with said medium, whereby the ends of said pole structure are located at opposite edges of said magnetic record and are magnetized oppositely and in accordance with said magnetomotive force, flux from said pole structure passing through said recording medium to magnetize the latter, with the concentration of flux being greatest at the ends of said pole structure, adjacent said magnetic conductors, and decreasing toward the middle of said pole structure.

2. A variable area magnetic recording head according to claim 1 wherein said magnetic pole structure comprises a plurality of thin individual magnetic members disposed in side-by-side relation with their thickness dimension parallel to the length of said pole structure, perpendicular to the movement of said recording medium, and wherein said individual magnetic members are held in spaced relation to each other by interposed spacer elements formed of non-magnetic material and placed between each of said magnetic members and the magnetic members adjacent thereto.

3. A variable area magnetic recording head according to claim 2 wherein said magnetic members are of equal thickness, and wherein said spacer elements are of equal thickness and hold said magnetic members in uniform spaced relation to each other.

4. A variable area magnetic recording head according to claim 2 wherein the thickness of said individual magnetic members varies progressively from the center of said pole structure to each end thereof.

5. A variable area magnetic recording head according to claim 2 wherein the thickness of said non-magnetic spacing elements varies progressively from the center of said pole structure to each end thereof.

6. A variable area magnetic recording head according to claim 1 wherein said magnetic pole structure extending transversely across said record material is provided with a cross-sectional shape which includes a V-shaped portion defining a narrow edge passing through the apex of said V-shaped portion from one magnetic conductor to the other, and wherein said magnetic pole structure is disposed with said narrow edge only in contact with said recording medium.

7. A variable area magnetic recording head according to claim 6 wherein the reluctance per unit length of said magnetic pole structure is uniform from end to end thereof.

8. A variable area magnetic recording head according to claim 6 wherein the reluctance per unit length of said magnetic pole structure varies progressively from the center of said structure to each end thereof.

9. A variable area magnetic recording head according to claim 6 wherein said magnetic pole structure comprises a plurality of thin individual magnetic members disposed in side-by-side relation with their thickness dimension parallel to the length of said pole structure and perpendicular to the direction of travel of recording medium, and wherein said individual magnetic members are held in spaced relation to each other by interposed spacer elements formed of non-magnetic material and placed between each of said magnetic members and the magnetic members adjacent thereto.

10. A variable area magnetic recording head according to claim 9 wherein said magnetic members are of equal thickness, and wherein said spacer elements are of equal thickness and hold said magnetic members in uniform spaced relation to each other.

11. A variable area magnetic recording head according to claim 9 wherein the thickness of said individual magnetic members varies progressively from the center of said pole structure to each end thereof.

12. A variable area magnetic recording head according to claim 9 wherein the thickness of said non-magnetic spacing elements varies progressively from the center of said pole structure to each end thereof.

References Cited in the file of this patent

UNITED STATES PATENTS 2,561,338 Camras ---------------- July 24, 1951
2,621,259 Grantham ---------------- Dec. 9, 1952

FOREIGN PATENTS 662,127 Great Britain ---------- Nov. 28, 1951

UNITED STATES PATENT OFFICE
CERTIFICATE OF CORRECTION

July 28, 1959

Patent No. 2,897,286

Ralph B. Atkinson et al

It is hereby certified that error appears in the printed specification of the above numbered patent requiring correction and that the said Letters Patent should read as corrected below.

Column 10, line 1, after "of travel of" insert -- said --.

Signed and sealed this 22nd day of December 1959.

(SEAL)
Attest:

KARL H. AXLINE
Attesting Officer

ROBERT C. WATSON
Commissioner of Patents